United States Patent
Huber et al.

(10) Patent No.: US 7,151,955 B2
(45) Date of Patent: *Dec. 19, 2006

(54) RADIO COMMUNICATION DEVICE AND PRINTED BOARD HAVING AT LEAST ONE ELECTRONICALLY CONDUCTIVE CORRECTION ELEMENT

(75) Inventors: Stefan Huber, München (DE); Thorsten Kowalski, München (DE); Martin Oelschläger, Berlin (DE); Michael Schreiber, Aying-Göggenhofen (DE); Martin Weinberger, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/503,857

(22) PCT Filed: Feb. 3, 2003

(86) PCT No.: PCT/DE03/00296

§ 371 (c)(1),
(2), (4) Date: Aug. 6, 2004

(87) PCT Pub. No.: WO03/067702

PCT Pub. Date: Aug. 14, 2003

(65) Prior Publication Data

US 2005/0159195 A1    Jul. 21, 2005

(30) Foreign Application Priority Data

Feb. 6, 2002    (DE) ................................ 102 04 877

(51) Int. Cl.
*H04M 1/00*    (2006.01)

(52) U.S. Cl. ................ 455/575.5; 455/90.3; 455/300; 343/851; 343/873; 379/433.01

(58) Field of Classification Search ............ 455/550.1, 455/575.1, 575.7, 575.8, 90.1, 90.2, 90.3; 343/700 R, 764, 743, 853, 855, 873, 851; 45/550.1, 575.1, 575.5, 575.7, 575.8, 90.1–90.3, 45/300, 301, 129; 379/429, 433
See application file for complete search history.

(56) References Cited

U.S. PATENT DOCUMENTS

| | | | |
|---|---|---|---|
| 4,648,125 A * | 3/1987 | Brown .................... | 455/575.1 |
| 5,508,709 A | 4/1996 | Krenz et al. | |
| 5,581,262 A * | 12/1996 | Kawahata et al. ... | 343/700 MS |
| 6,031,494 A * | 2/2000 | Okabe et al. ............... | 343/702 |
| 6,342,859 B1 * | 1/2002 | Kurz et al. .................. | 343/702 |
| 6,407,710 B1 * | 6/2002 | Keilen et al. ............... | 343/702 |
| 6,492,952 B1 * | 12/2002 | Hu ............................. | 343/702 |
| 6,505,036 B1 * | 1/2003 | Zilberberg et al. .......... | 455/117 |
| 6,580,397 B1 * | 6/2003 | Lindell ....................... | 343/702 |

(Continued)

FOREIGN PATENT DOCUMENTS

EP    0 070 150    7/1982

(Continued)

*Primary Examiner*—Charles N. Appiah
(74) *Attorney, Agent, or Firm*—Bell, Boyd & Lloyd LLC

(57) ABSTRACT

The invention relates to a radio communication device having at least one additional, current-conducting correction element connected to a printed board in the device. The correction element and printed board are configured in such a manner that a targeted, virtual current path elongation is brought about for an electric current induced on the printed board by electromagnetic radio fields of the antenna while the defined longitudinal and traverse dimensions of the printed board remain substantially unchanged.

27 Claims, 5 Drawing Sheets

U.S. PATENT DOCUMENTS

| | | | |
|---|---|---|---|
| 6,597,896 B1 * | 7/2003 | Faessler | 455/575.5 |
| 6,615,026 B1 * | 9/2003 | Wong | 455/575.5 |
| 6,867,746 B1 * | 3/2005 | Mendolia et al. | 343/841 |
| 6,909,911 B1 * | 6/2005 | Boyle et al. | 455/575.5 |
| 6,947,000 B1 * | 9/2005 | Ito | 343/702 |
| 2001/0053672 A1 * | 12/2001 | Masaki | 455/90 |
| 2002/0022459 A1 * | 2/2002 | Kobayashi | 455/90 |

FOREIGN PATENT DOCUMENTS

| | | |
|---|---|---|
| EP | 1 172 884 | 1/2002 |
| WO | WO 98/20577 | 5/1998 |
| WO | WO 99/54956 | 10/1999 |

* cited by examiner

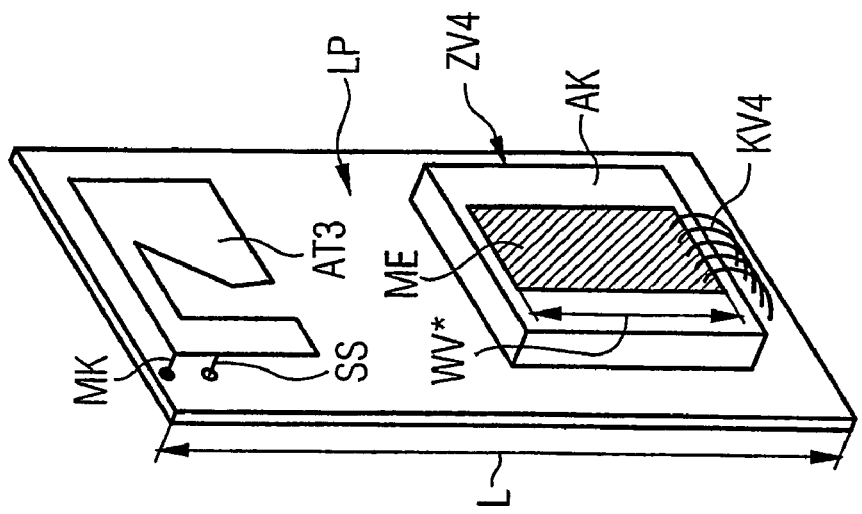
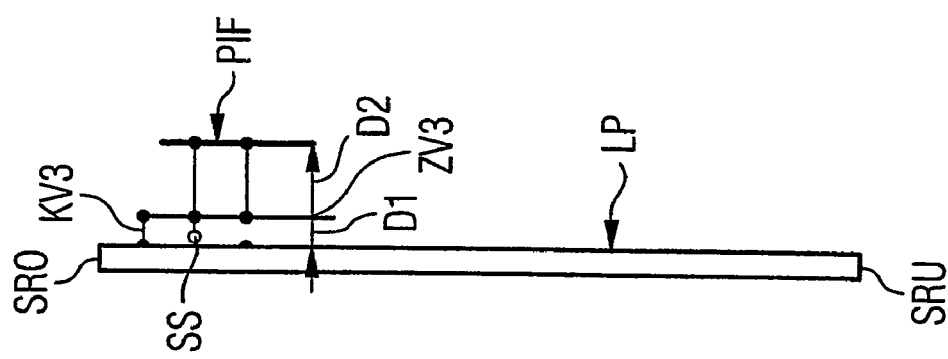
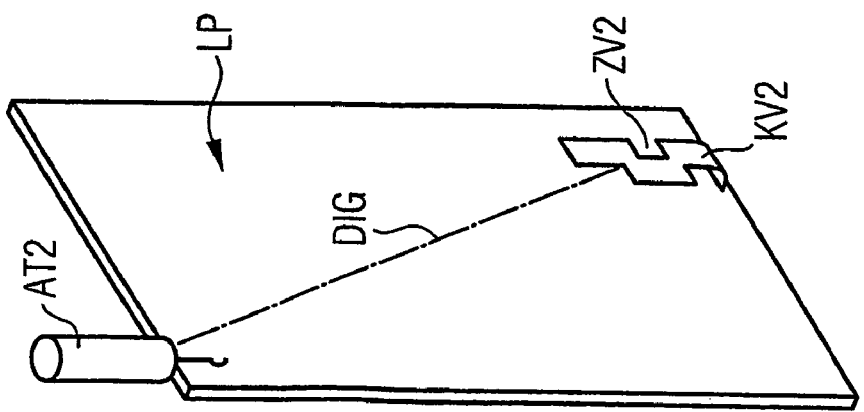

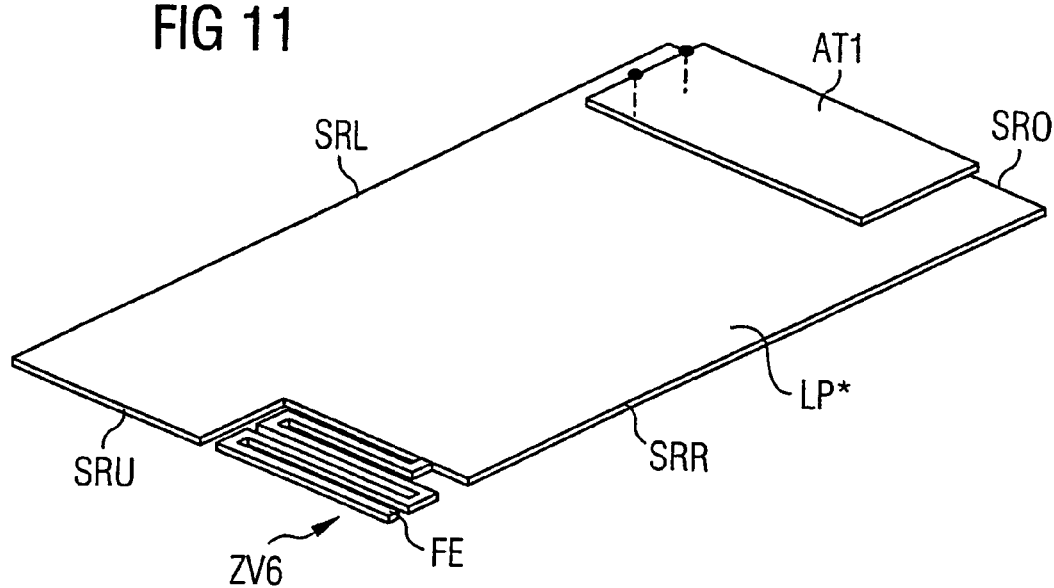
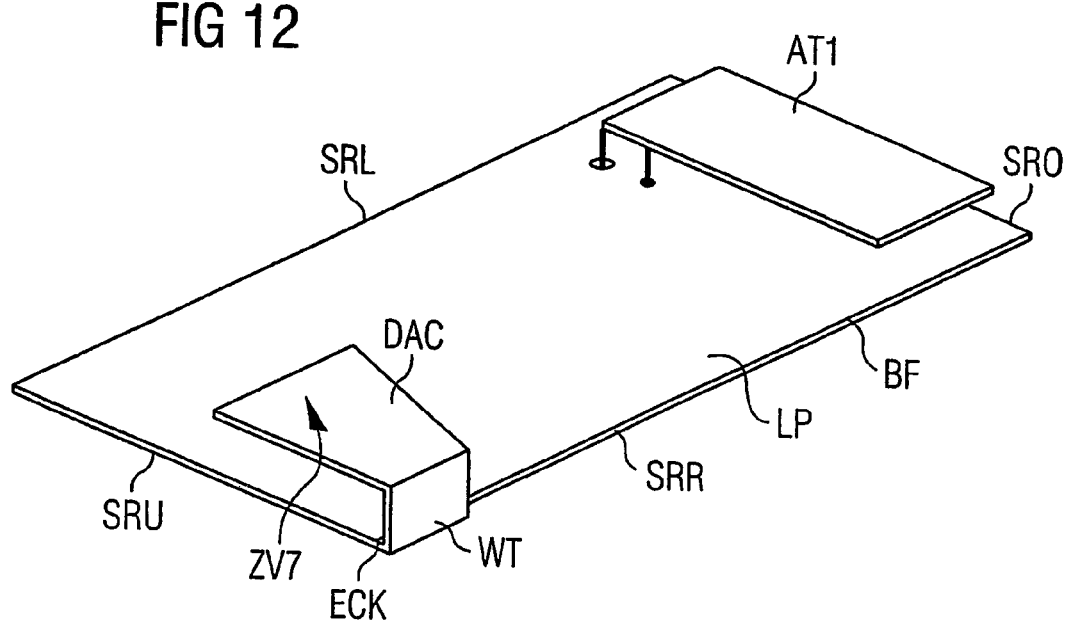

RADIO COMMUNICATION DEVICE AND PRINTED BOARD HAVING AT LEAST ONE ELECTRONICALLY CONDUCTIVE CORRECTION ELEMENT

BACKGROUND

Embodiments of the present invention relate to a radio communication device having at least one printed circuit board of specified length and a specified transverse dimension accommodated in a housing and having at least one antenna, coupled to said printed circuit board, for emitting and/or receiving electromagnetic radio fields.

Through the emission of energy from radio communication devices, a certain portion of the electromagnetic radio fields is usually also radiated into the human body. This is particularly true in cases of mobile radio devices and cordless telephones such as, for example, those conforming to the DECT (Digital Enhanced Cordless Telecommunications) standard. Organic tissue in a user's head can in particular be exposed to impermissibly high levels of radio fields when the radio communication device is placed next to it. Limiting values for thermal energy absorption have consequently been specified for human organic tissue. What is termed the SAR ("Specific Absorption Rate") rating is used as a criterion for measuring the radiation load to which respective users are actually exposed. This rating indicates in watts per kilogram the specific absorption rate at which a pre-definable area of tissue volume is heated.

An exemplary embodiment of the invention describes a radio communication device to be set in a better controlled manner in terms of its electromagnetic radiation characteristics. A radio communication device is coupled to at least one additional, electrically conductive correction element via a printed circuit board wherein a targeted, fictive current-path elongation is produced for electric current induced by electromagnetic radio fields of the antenna. Under the exemplary configuration, the pre-defined longitudinal and transverse dimensions of the printed circuit board are substantially retained.

The local distribution of the resulting electric current on the printed circuit board can in this way be better set in a targeted, (i.e., controllable) manner.

The current-path elongation effected on the printed circuit board with the aid of the additional, electrically conductive correction element makes it possible to influence the local current distribution there in such a manner that any present local maximum of the electric current or, as the case may be, of a magnetic field associated with said current, can be displaced into a less critical area of the device and/or reduced. It further makes it possible to reduce or even substantially avoid impermissibly intense "hotspots", where areas of tissue volume having higher SAR values compared to such areas having lower SAR values, and hence reduce or even substantially avoid local variations in the thermal loading of areas of tissue volume—such as, for example, in the area of the respective user's head. By means of at least one such additional correction element, the SAR distribution can, viewed overall, be made at least more even or, as the case may be, more homogeneous compared to the SAR distribution of the same printed circuit board not having a correction element. Improved antenna impedance matching of the respective radio communication device and hence improved energy emission can, moreover, be advantageously achieved, which is favorable in particular when device dimensions are small with the device being relatively compact in design.

Other exemplary embodiments are described in the figures and text that appear below.

BRIEF DESCRIPTION OF THE DRAWINGS

The invention and its wide variety of potential embodiments will be more readily understood through the following detailed description, with reference to the accompanying drawing in which:

FIGS. 5 to 7 are schematics of further exemplary embodiments of correction elements according to the invention which are in each case coupled to the printed circuit board of a radio communication device;

FIGS. 11 and 12 are each schematics of a printed circuit board having a variant form of the correction element coupled for virtual current-path elongation.

DETAILED DESCRIPTION

Elements having the same function and mode of operation are identically referenced in FIGS. 1 to 12.

Figure 1:
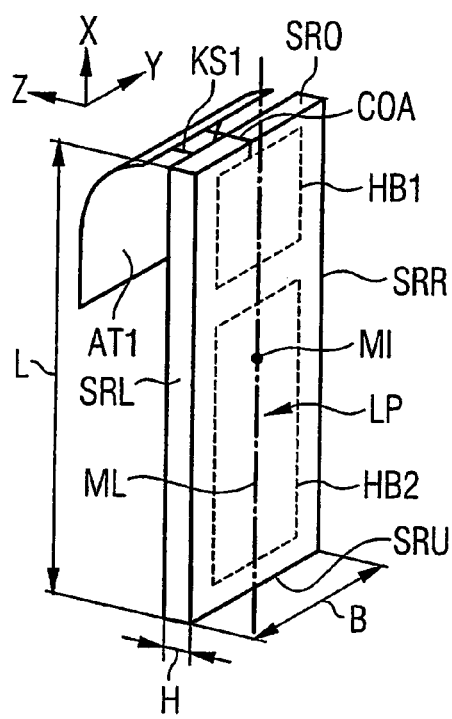
FIG. 1 is a 3-dimensional schematic of a printed circuit board and a radio antenna, coupled thereto.
Figure 10:
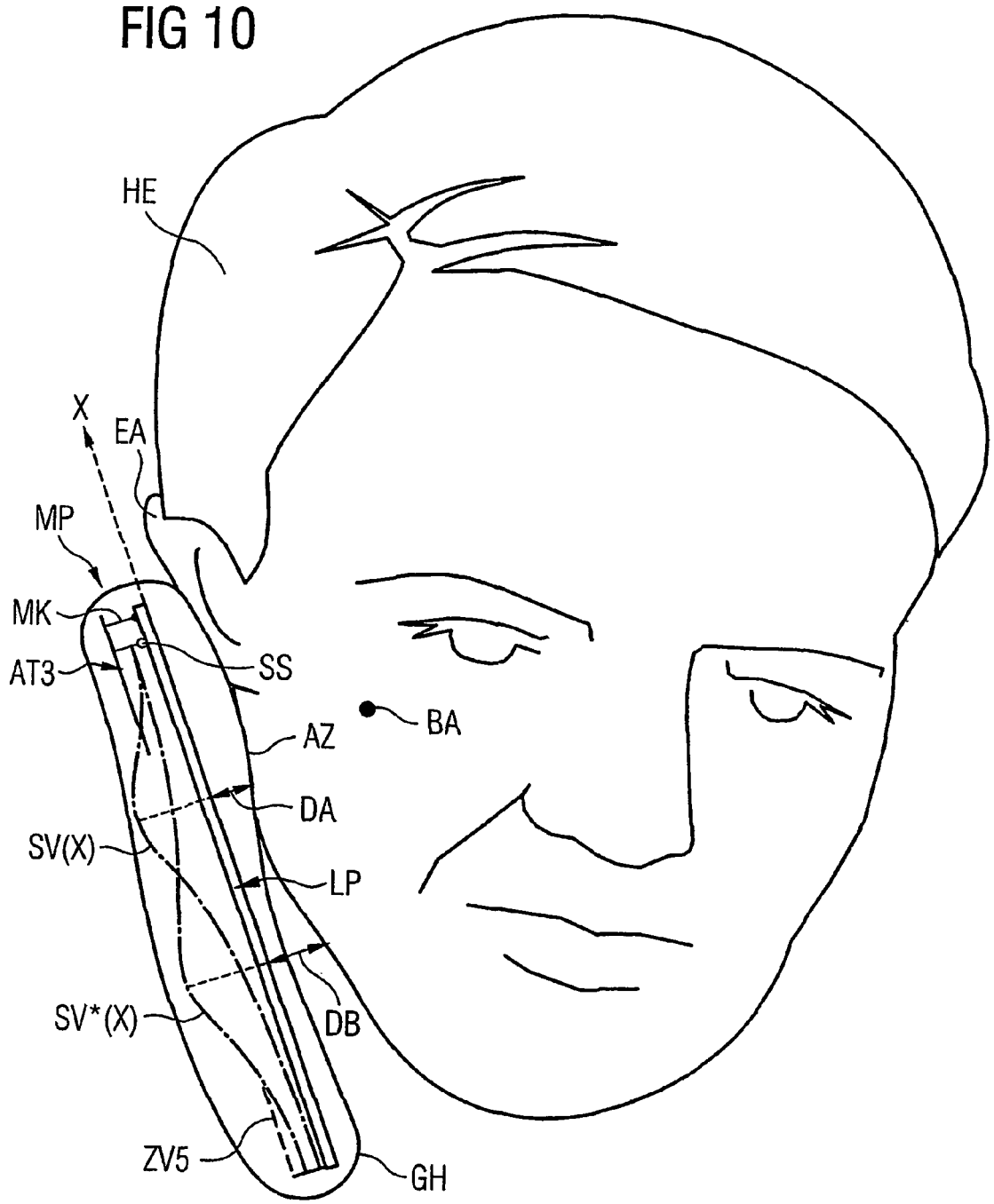
FIG. 10 is a schematic of a radio communication device according to the invention having a printed circuit board and having an additional, current-path elongating correction element according to FIG. 9 placed next to a user's head.

FIG. 1 is a 3-dimensional schematic of a printed circuit board LP as customarily accommodated in the housing of a radio communication device such as, for example, a mobile radio telephone or cordless telephone. In FIG. 10 a printed circuit board LP of this type is, by way of example, provided inside the housing GH of a mobile radio device MP shown schematically in a lateral perspective being used in keeping with its intended purpose next to a user's head HE. The mobile radio device MP is preferably a mobile radio telephone operating in particular according to the GSM (Global System for Mobile Communications), IS95, IS136, IS2000, DCS1900, GPRS (General Packet Radio Service), EDGE (Enhanced Data Rates for GSM Evolution), or UMTS (Universal Mobile Telecommunication System) standard. The device is preferably dimensioned so as to be portable for a user and thus capable of being co-located with said user at changing locations in the radio cells of radio communication systems of the above type. In addition to or independently of the voice-transmitting or, as the case may be, telephoning functions of a mobile radio device of this type, the device can, where applicable, also perform the function of transmitting other messages such as, for example, data, images, fax messages, e-mails, and the like.

The printed circuit board according to FIG. 1 may also be integrated in the housing of another cordless telephone handling its communication traffic via radio with a local base station or other user devices. Cordless telephones of this type currently preferably operate according to what is termed the DECT (Digital Enhanced Cordless Telecommunications) or Bluetooth standard.

Viewed 3-dimensionally, the printed circuit board LP shown in FIG. 1 has substantially a flatly rectangular cuboidal shape, which is to say its four lateral edges SRL, SRR, SRO, SRU together form the external contour of a rectangle extending longitudinally further than its width. The spatial geometry is clarified by additionally including the X, Y, and Z coordinates of a Cartesian coordinate system as shown in FIG. 1, with the X coordinate extending along the long sides SRL, SRR of the printed circuit board LP and the Y direction running parallel to the wide sides SRO, SRU of said board. The equipping area BF of the printed circuit board LP is thus located substantially in the X, Y plane. The Z direction is here assigned to the height or, as the case may be, thickness H of the printed circuit board LP with its various components such as, for example, high-frequency module HB1 and evaluation/control module HB2.

The rectangular shape of the printed circuit board is suitable preferably for mounting in a flat, substantially cuboidal housing. The printed circuit board can have other external contours which, for practical purposes, are generally selected to match the respective geometry of the housing of the respective radio communication device.

For the purpose of receiving and/or transmitting radio signals, the printed circuit board has a high-frequency module HB1 with an antenna AT1 coupled to the area near the top half of its length as shown in the exemplary embodiment of FIG. 1. In the interest of a simplified representation, the high-frequency module HB1 is indicated merely by a dashed outline. Electromagnetic radio waves can be emitted into the radio space and/or detected coming from this space with the aid of the transmitting/receiving antenna AT1. The antenna is connected via an electrical contact lead COA ("hot conductor") to the high-frequency module HB1 for the purpose of supplying energy, in particular for power feeding, and for controlling radio signals. Via a second electrical lead KS1 ("cold conductor"), said antenna simultaneously contacts at least one ground area on the printed circuit board LP. A ground area of this type can be formed by means of, for example, the metal housing cover or, as the case may be, screening cover of the high-frequency module HB1 or by means of a conductive layer provided either over the entire surface of the top or bottom side of the printed circuit board or on a continuity-of-ground basis as an intermediate layer in the printed circuit board LP. The contact leads are preferably configured so that the antenna AT1 is attached to the printed circuit board LP with sufficient mechanical stability, and will thus maintain its specified position or, as the case may be, location ideally permanently. For this purpose the contact leads can in particular be designed as supports so as to individually or jointly also assume a kind of flange function mechanically securing the antenna AT1 to the printed circuit board.

In the exemplary embodiment shown in FIG. 1 the antenna AT1 is mechanically and electrically coupled to the top end face or, as the case may be, wide side SRO of the printed circuit board LP with the aid of said contact leads COA, KS1. The antenna AT1 is here embodied as a planar antenna. It is approximately rectangular in shape. With the aid of the mechanical connecting segments COA, KS1 it is positioned, proceeding from the top lateral edge SRO of the printed circuit board LP, so as to project into a space enclosed by the four lateral edges SRL, SRR, SRO, SRU along the plane normal in the Z direction. The antenna's illustrated orthogonal projection onto the equipping area of the printed circuit board LP therefore lies substantially within the peripheral area BF bounded by the lateral edges SRL, SRR, SRO, SRU of the printed circuit board LP. Under this configuration, the antenna AT1 does not project in a manner beyond the four lateral edges of the equipping area BF of the printed circuit board LP. One effect of this configuration is that the surface of the printed circuit board is neither lengthened nor broadened by the coupled antenna. With the aid of the connecting segments, the antenna AT1 is inclined toward the printed circuit board LP or, as the case may be, bent over, in such a manner as to lie like a further layer above and/or below the topology plane of the printed circuit board LP within the space bounded by the four lateral edges. This antenna arrangement makes it advantageously possible to implement particularly compact or, as the case may be, small device dimensions.

Other electric modules may be accommodated in the second, bottom half of the printed circuit board LP shown in FIG. 1 which, in the interest of a simplified representation, are likewise indicated merely by a dashed outline and designated HB2. These serve to control the input and/or output elements of the mobile radio device MP such as, for example, its keypad, display, loudspeaker etc., and to process the radio signals received and/or to be sent by means of the high-frequency module HB1.

Figure 2:
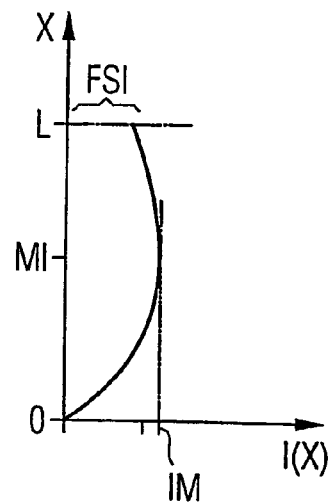
FIG. 2 is a schematic of the local distribution of the electric current contributing to the SAR effect which flows approximately along the length of the printed circuit board shown in FIG. 1 when the mobile radio device is being operated.

In a printed circuit board of this type having a coupled antenna, there is an associated, local total current distribution in the X direction, which is to say viewed along the length of the printed circuit board, as shown graphically in FIG. 2. The effective total current I(X) flowing in each longitudinal locus X of the printed circuit board LP is summated or, as the case may be, integrated over its total cross-sectional width B in the X direction, and hence in the longitudinal direction of the printed circuit board, is laid off along the abscissa. It is assumed that this flow of electric current having the X direction as its preferred direction is caused by H fields, which is to say by magnetic fields arising locally in the near area of the antenna AT1 when it is operating.

The origin of the X axis is assigned in FIG. 2 to the bottom lateral edge SRU of the printed circuit board LP shown in FIG. 1, whereas the top lateral edge SRO corresponds to the length value X=L. In the area of the electrical contacting COA between the high-frequency module HB1 and the antenna AT1 the feed or, as the case may be, base current $FSI \neq 0$ flows toward the antenna AT1 at the longitudinal point X=L; because a defined feed current FSI is injected from the high-frequency module HB1 into the base of the antenna AT1. In contrast to this, the flow of current in the longitudinal direction of the printed circuit board LP is interrupted at its bottom free end by the boundary limitation, which is to say that I(X)=0 largely applies at the end face opposite the antenna AT1. In the preferred application of what is termed a $\lambda/4$ antenna, the electrical field has a maximum at the bottom lateral edge or at the free end SRU opposite the antenna. Owing to the geometry of the printed circuit board LP having the shape of an extended rectangle, the largest effective current amplitude for the SAR effect occurs along the center longitudinal axis ML approximately in the middle MI of the printed circuit board LP, which is to say in the region of the intersection of its diagonals, for the resulting summation current I(X) respectively integrated via the cross-sectional width B. Viewed over the transverse direction Y of the printed circuit board, owing to skin and other current-displacing effects the component of the current flow intensity in the X direction in the area along the two longitudinal edges SRL, SRR is greater than along the center line ML, with the distribution of current intensity on the longitudinal edges SRL, SRR being substantially axially symmetrical to the center longitudinal axis ML. Said current distribution leads to an H field operative for the SAR effect or a resulting H field, to which the summation current I(X)—as shown in FIG. 2—having a main concentration along the center longitudinal axis ML can be assigned. The maximum of the effective current amplitude at the longitudinal point X=MI is designated IM in FIG. 2.

A coupled structure of this type having with at least one antenna and at least one electrically conductive printed circuit board connected thereto therefore gives rise to locally inhomogeneous current distribution on the surface of the printed circuit board, and there are local variations in the intensity of summation current flow affecting the SAR effect.

A measuring method described in detail in European standard proposal EN50361 (which incorporated by reference herein) is preferably used for determining the SAR ratings of mobile radio devices or, expressed in a general way, of radio communication devices, as the measure of the thermal heating of a specific area of tissue volume. The aim of this method is to identify the respective user's site of maximum thermal loading. The SAR rating is then produced by means of an integration over a specific, standardized volume of tissue at the location where the mobile radio device MP is placed next to the respective user's head HE when being used in keeping with its intended purpose (see also FIG. 10).

Extensive tests using an electromagnetic measuring probe in a model head filled with a simulation solution have shown that heating of the organic tissue is subject to local variation, and has a local distribution having at least one maximum and/or minimum value. This locally varying field concentration is due at least in part to a local distribution, corresponding thereto, of summation current on the printed circuit board LP such as, for example, I(X) shown in FIG. 2. An electric summation current I(X) of this type preferably flows along the length of the printed circuit board LP when the transmitting and/or receiving antenna such as, for example, AT1 shown in FIG. 1 is embodied as a λ/4 antenna and forms a radiant dipole together with the printed circuit board LP. The effect of the printed circuit board in an initial approximation is that of a kind of supplementary λ/4 antenna to the antenna AT1. The local distribution I(X) of the flow of current operative for the SAR effect along length X of the printed circuit board LP is illustrated in FIG. 2. The near area is here the local area that is less than the distance $2D^2/\lambda$ (λ is the wavelength; D is the device length). In, for example, the GSM radio network having a frequency range between 880 and 960 MHz (mid-frequency 900 MHz), the wavelength λ is approximately 35 cm. In the PCN (Private Commercial Network) (E Network) having a frequency band between 1710 and 1880 MHz, the wavelength is approximately 17 cm. The wavelength λ is approximately 15 cm in a UMTS radio communication system having a frequency transmission range between 1920 and 2170 MHz. While the electromagnetic near field can be expected to have a penetration depth of approximately 6 cm in the case of the GSM radio system on account of the local current distribution on the printed circuit board, and approximately 5 cm in the case of the PCN network, the penetration depth of the near field is approximately 2 to 4 cm in the case of a UMTS mobile radio device owing to the local current distribution on the main printed circuit board. The smaller the local depth of penetration into the tissue, the greater the measured SAR rating can become given the same assumed transmitter power of the antenna. This typically occurs because a higher electromagnetic field density exists per specified tissue volume, which produces a larger flowing current, and hence produces a greater field concentration.

It is desirable to set electromagnetic radiation fields, in particular the H field in the near area of the respective radio communication device, and/or electric currents due thereto, in a more controlled manner in terms of their local distribution.

Figure 3:
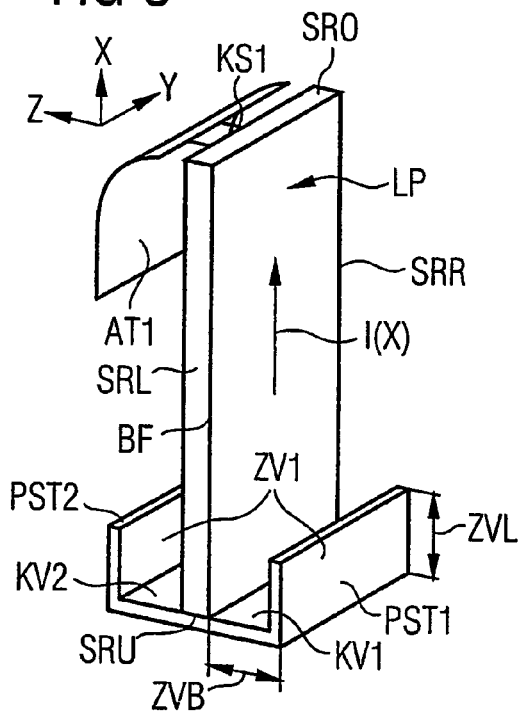
FIG. 3 is a 3-dimensional schematic of a printed circuit board for a radio communication device to which board a correction element elongating the current path in a manner according to the invention is additionally coupled compared to the printed circuit board shown in FIG. 1.

FIG. 3 is a 3-dimensional schematic of another exemplary embodiment of a correction element for virtually elongating the current path on the printed circuit board LP shown in FIG. 1. The first correction element is designated KV1 in FIG. 3. Under the exemplary embodiment, the element is mounted on the narrower-bottom lateral edge SRU of the printed circuit board LP that is situated opposite the other, narrower-top lateral edge SRO having the coupling of the antenna AT1. The element preferably has a substantially U-shaped profile. Toward both the top and the bottom side of the printed circuit board LP a bridging element KV1 or KV2 is running substantially vertically, which is to say along the plane normals Z of the top and bottom side of the printed circuit board LP. Said bridging elements KV1, KV2 are mounted preferably symmetrically with respect to the printed circuit board LP on its bottom end face SRU. Elements KV1, KV2 preferably run substantially along the entire width B of the printed circuit board LP along its bottom lateral edge SRU. This provides a beneficial coupling of the bridging elements in terms of characteristic wave impedance. A substantially planar, second bridging element PST1 or PST2 is in turn attached to each transverse bridging element KV1 or KV2 in such a manner as to run substantially parallel to the top or bottom side of the printed circuit board LP (=printed circuit board equipping level) and to be positioned within the space bounded by the four lateral edges of the printed circuit board. The second bridging elements PST1, PST2 are thus substantially perpendicular to the transverse bridges KV1, KV2 of width ZVB along the Z axis. The correction element KV1 is in this way coupled both mechanically and electrically to the printed circuit board LP.

Having a U-shaped profile, the correction element ZV1 is disposed in a roof-like configuration on the face end of the printed circuit board LP that is opposite the printed circuit board end face SRO having the antenna coupling. Together with the antenna AT1 at the other end of the printed circuit board LP, the roof-like covering of the printed circuit board LP by the correction element KV1 forms a roof capacitance. The overall electrical structure includes the printed circuit board LP, the antenna AT1 coupled thereto, and the correction element ZV1 likewise coupled to the printed circuit board to form a short rod antenna having on its ends plate-shaped electrodes or, as the case may be, capacitor areas in the form of the antenna AT1, and the correction element ZV1. Owing to the effect of the correction element ZV1 as an additional end capacitance, in electrical terms the printed circuit board LP is virtually elongated so that a targeted, electric current-path elongation can be provided for a summation current I(X) produced on the printed circuit board LP by electromagnetic radio fields of the antenna AT1. The summation current is also operative for the SAR effect, because electric summation current flowing along the length of the printed circuit board LP—and in the X direction in the exemplary embodiment shown in FIG. 3—can now additionally flow onto the expansion area of the correction element ZV1. As can bee seen in FIG. 3, corrective element ZV1 extends from the front bottom edge SRU of the printed circuit board LP, and is folded over and/or under the space bounded by the four lateral edges of the printed circuit board LP. The path length additionally provided by the respective correction element (ZV1) from its area of coupling to the printed circuit board to its front end forms a specific and desirable elongation of the current path defined by the original length (e.g., L) of the printed circuit board (e.g., LP).

In FIG. 3 the correction element ZV1 provides a path elongation ZVB in the Z direction due to the respective transverse bridge KV1, KV2 and, additionally in total, by the further path length ZVL in the X direction due to the respective bridging element PST1 or, as the case may be, PST2. The dominant factor for the electrical path elongation under the example of FIG. 3 is the mechanical routing of the respective correction element proceeding from its area of coupling to the printed circuit board LP to its front end measured in the imagined, non-folded planar state of the correction element. The correction element extends the length of the printed circuit board, although not in the original topology plane of the printed circuit board but, instead, into a space which is bounded by the four lateral edges of the printed circuit board and is situated above and/or below the peripheral area BF of the printed circuit board. FIG. 3 also shows the path elongation which can be achieved by means of the total fold length of the correction element ZV1 in the X and Z direction, which is to say in total by means of the path sections ZVB and ZVL. A 30 percent elongation in a real trial can result in an approximately 20 percent reduction in the SAR rating.

Figure 4:
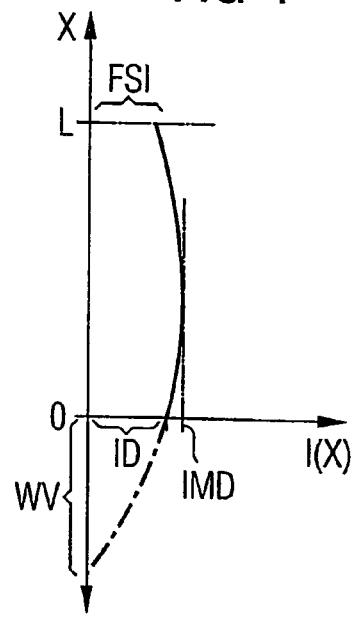
FIG. 4 shows the local distribution of the flow of electric current along the length of the printed circuit board shown in FIG. 3 having an additionally coupled current-path elongating correction element.

FIG. 4 is a schematic of local distribution of the flow of electric current along the length of the printed circuit board shown in FIG. 3 in the X direction, with the additional correction element ZV1 having been attached to the printed circuit board LP. In contrast to the printed circuit board LP shown in FIG. 1 which does not have a correction element and on which a resulting maximum current IM occurs approximately in the center of the length when X=MI, the effective current level now flattens down at location X=MI. In the middle area MI of the printed circuit board LP, the value I(X=MI)=IMD<IM. There is in particular homogenizing of the local current distribution on the printed circuit board LP viewed in the X direction under this configuration. Since a flow of current, here having I(X=0)=ID, is now also produced at the bottom end of the printed circuit board LP on account of the additional coupling of the correction element ZV1, the flow of current shifts or, as the case may be, extends to the outer, open end of the correction element ZV1. With the aid of the correction element ZV1 it is thereby possible to, in a defined manner, set a current level distribution I(X) between X=0 and L along the length of the printed circuit board having, viewed from one to the other front end of the printed circuit board, a more homogeneous, which is to say approximately more constant current density compared to a printed circuit board according to FIG. 1 not having a correction element. FIG. 4 additionally shows the virtual current-path elongation WV produced using the correction element ZV1 measured from the area of coupling to the bottom end face SRU (X=0) of the printed circuit board LP to the outer, open end (X=L) of the correction element ZV1. The flow of current is not interrupted until at the open front end of the supplementary element ZV1, so that the summation current level is not substantially 0 until at that point. The summation current level I(X) along the elongation path WV is additionally indicated in FIG. 4 by means of a dot-and-dash line. Said level is formed by interpolating the values of the current level curve between the top and bottom end face of the printed circuit board LP, which is to say between X=0 and X=L, and the current level value of 0 ampere at the free or, as the case may be, open end of the correction element.

In an initial approximation the virtual, electric current-path elongation resulting from the additional coupling of the correction element such as, for example, ZV1, along the length, in the X direction in the exemplary embodiment here, is determined in particular by the sum of the path lengths of the correction element in the Z, X plane. Additionally thereto or independently thereof, the total area formed by the respective correction element can also, influence the resulting overall current length, because the larger the provided area of the correction element is, the greater the capacitive charging possibility will be and hence the facilitated current harmonizing on the printed circuit board. Splitting of the current distribution on the printed circuit board into two or more maxima may also be implemented under alternate embodiments without deviating from the spirit and scope of the invention.

The correction element such as, for example, ZV1, can to practical advantage be embodied in a single piece. For this purpose it can preferably be produced by bending or folding from an originally planar, electrically conductive element.

At least one electrically conductive element, which may be a single- or multi-layer electrically conductive sheet, coating element, foil, and/or other electrically conductive surface or structural element is preferably provided as the respective correction element such as, for example, ZV1. It may it certain circumstances also suffice to provide one or more electrically conductive wires as the correction element.

In certain circumstances a virtual current-path elongation along the length of the printed circuit board can also be effected by means of a correction element which is not coupled over the entire wide side of the printed circuit board LP to the end face opposite the antenna but, instead, is formed by means of a strip-shaped, electrically conductive element whose width is selected as being substantially less than that of the printed circuit board LP. FIG. 5 illustrates a 3-dimensional schematic of a correction element of this type designated ZV2. The strip-shaped correction element ZV2 is embodied in meander form in the X, Y plane so that a relatively large current-path elongation can be provided in the X direction, along the length of the printed circuit board LP. The corrective element ZV2 is mechanically and/or electrically connected to the printed circuit board LP in the area of its front bottom edge opposite the front top edge to which an outwardly projecting stub antenna AT2 is coupled. The correction element ZV2 can also be coupled to the printed circuit board LP by simple means by bending off or bending over a partial section of the printed circuit board ground area. The meander-shaped correction element ZV2 is preferably kinked or, as the case may be, bent over along an end partial section by approximately 90° with respect to its otherwise substantial planarity. This coupling section is designated KV2 in FIG. 5. The correction element ZV2 extends with its electrically conductive, substantially planar surface for the most part in a plane which is substantially parallel to the topology plane of the printed circuit board LP. A desired current-path elongation can be set in a controlled manner by appropriately selecting the meander shape, which is to say by selecting the number of meander turns and/or selecting the length of those partial sections of the correction element ZV2 running substantially in the longitudinal direction X or transversally thereto in the Y direction of the printed circuit board LP.

Viewed in general terms, a desired current-path elongation for a printed circuit board of a specified length requiring to be maintained and specified width requiring to be maintained can be provided in a targeted manner by additionally coupling one or more correction elements to the printed circuit board in such a manner that said correction element only extends into a space which is situated above and/or below the printed circuit board and which is bounded by the lateral edges of said printed circuit board. This produces a multi-layered structure, wherein the printed circuit board and the respective correction element are stacked one above the other under the exemplary embodiment. The correction element can have one or more folds in one or more planes situated within the plane bounded by the lateral edges of the printed circuit board and arranged having a height clearance to said plane. In this way the printed circuit board is not elongated or widened in its topology plane, wherein its originally specified dimensioning is largely maintained in terms of its originally specified length and width.

For virtual elongation of ground it can, in certain circumstances, be of practical advantage to embody a partial area of the ground area of the printed circuit board itself in such a way that an additional elongating element is produced. In FIG. 11, a correction element ZV6 of this type is an integral part of the printed circuit board ground area of a printed circuit board LP* having an originally rectangular external contour. A partial area of the ground area of the printed circuit board LP* on the end face SRU of the printed circuit board opposite the antenna AT1 is here embodied as being separated from said board in the same topology plane in such a manner as to act like an elongation of the current path. The correction element ZV6 is given its meander shape through serially consecutive 90° kinks or, as the case may be, rectangular zigzag bending of bridge sections. Said meander-shaped correction element KV6 can be produced in particular by being punched or cut out from the originally rectangular printed circuit board LP shown in FIG. 1. The correction element ZV6 is preferably provided in a corner area of the bottom front of the printed circuit board SRU, said area being located transversely, in particular diagonally displaced in relation to the antenna coupling in the corner area of the top, opposite front SRO. This configuration creates an environment wherein a substantially diagonal path between the antenna AT1 and the free end FE of the correction element ZV6 provides the longest possible virtual path elongation for the summation current, operative in terms of the SAR effect, on the available printed circuit board area given the same specified, rectangular external contour.

The current path can be set in a controlled manner by means of folds in the respective correction element within the printed circuit board equipping area and/or over the top and/or bottom side of the printed circuit board. The correction element can be kept relatively short in the X direction due to the meander shape, where in each case a partial section extending in the longitudinal direction of the printed circuit board alternates with a section that is transverse (i.e., orthogonal), to the length of the printed circuit board, with two such consecutive partial sections enclosing between themselves an angle greater than zero and in particular being mutually displaced by approximately 90°; because the zigzag shape allows a longer path to be achieved for the electric current compared to a correction element having a straight strip shape. The maximum possible current path on the printed circuit board LP* shown in FIG. 11 starts in the area of the antenna AT1 and terminates at the free end FE of the correction element ZV6 after traversing its meander-shaped turns.

If an antenna such as, for example, AT2 shown in FIG. 5, is coupled to the printed circuit board LP in a corner area of its front end so as to project outward along its length, it is of practical advantage to mechanically and electrically attach the correction element to the printed circuit board in such a manner with respect to the antenna that it will provide a current-path elongation substantially along the diagonal DIG, indicated by means of a dot-and-dash line, from the corner area of the antenna to the diametrically opposite corner area of the correction element ZV2 (see FIG. 5). The diagonal DIG is additionally indicated in FIG. 5 by means of a dot-and-dash line. It describes the maximum path length that can be taken by an electric current on a substantially rectangular printed circuit board such as, for example, LP shown in FIG. 5. The antenna AT2 is embodied in FIG. 5 as an outwardly projecting rod antenna. The current path can be efficiently elongated through the mutually diagonally displaced arrangement of the antenna AT2 and correction element ZV2. The length of the correction element in the longitudinal direction of the printed circuit board can at the same time be kept substantially compact, which is to say relatively short. A meander-shaped correction element of this type preferably has a length preferably between 1 and 4 cm.

The correction element may also be located laterally in a space on the peripheral area BF formed by the lateral edges SRL, SRR, SRO, SRU of the printed circuit board LP, as illustrated in FIG. 1. By way of example, in FIG. 12 a correction element ZV7 is coupled to the right-hand long side SRR in the area of the corner ECK approximately diagonally opposite the antenna AT1. The correction element ZV7 has a first partial element WT secured substantially orthogonally referred to the peripheral area BF on the long lateral edge SRR. On the upwardly projecting end of said first partial element WT is a second partial element DAC which is bent over with respect to the first partial element WT by approximately 90° and which projects into the peripheral area, or it forms the edge of the first partial element WT. It is thus arranged having a height clearance to the printed circuit board equipping area and runs in the form of a roof-type partial cover substantially parallel to said area. The first and second partial element WT, DAC can also be embodied as one component. The bracket or, as the case may be, elbow-type correction element KV7 is produced by, for example, bending over an originally planar, electrically conductive element such as, for example, a copper sheet.

Other correction element geometries can also be of practical advantage for reducing the SAR effect or for displacing undesired "hotspots" into less critical areas of the device provided the respective correction element is coupled to the printed circuit board in such a manner that its orthogonal projection with respect to the equipping area of the printed circuit board LP will be substantially situated within the peripheral area BF bounded by the lateral edges SRL, SRR, SRO, SRU of the printed circuit board LP. In certain circumstances it can, for example, suffice to omit the second partial element DAC and merely cause the first partial element WT to upwardly project enclosing an angle of 90° or less with respect to the printed circuit board area at one or more partial sections of one or more lateral edges. A correction element of this type can in particular be formed by suitably bending over or flanging at least one lateral edge of the printed circuit board either along a partial section or along its entire length. It can also be advantageous to partially or completely raise up or, as the case may be, bend over the wide side—SRU in FIG. 12 here—which is opposite the front of the printed circuit board having the antenna coupling.

FIG. 6 shows a further embodiment of an artificial current-path elongation that does not itself elongate or widen the printed circuit board in its topology plane. What is termed a PIFA antenna (Planar Inverted F Antenna) PIF is coupled to the printed circuit board LP as shown in FIG. 6 via a current feed point SS. The antenna PIF is then fed with an electric current. The PIFA antenna PIF is arranged having a clearance to the topology plane of the printed circuit board LP. Under the embodiment of FIG. 6, antenna PIF if oriented substantially planar and is substantially parallel to the topology plane of the printed circuit board LP. The PIFA antenna is positioned in the area of the top front end SRO of the printed circuit board LP. A ground area ZV3 is located between the printed circuit board LP and PIFA antenna PIF so that electric radio fields can be produced and decoupled into free space. Ground area ZV3 extends substantially parallel to the topology plane of the printed circuit board and PIFA antenna. Ground area ZV3 has a transverse clearance with respect to the printed circuit board LP, which is to say a height D1 (preferably greater than 1 mm), and a transverse clearance D2 with respect to the PIFA antenna. Electric and/or magnetic fields that can be decoupled into space form between the PIFA antenna and the ground area ZV3 arranged having a transverse clearance to said antenna. The ground area ZV3 is connected in the area of one of its front ends to the ground of the printed circuit board LP. The ground coupling is designated as KV3 in FIG. 6. An artificial elongation of the printed circuit board LP in terms of the available current path along its length can be provided by simple means by appropriately elongating the length of the ground area ZV3, present in any event, of the PIFA antenna PIF along the length of the printed circuit board LP. As the PIFA antenna is arranged in two layers over the surface of the printed circuit board, the overall result is a multi-layer structure that does not increase the original dimensions of the printed circuit board in terms of length or width but, instead, retains these dimensions.

FIG. 7 is a 3-dimensional schematic of the printed circuit board LP shown in FIG. 1 having a further correction element ZV4 which electrically elongates the electric current path along the length of the printed circuit board LP, which is to say in the X direction along the long sides of the printed circuit board LP in the exemplary embodiment, without altering the printed circuit board's original length or width. The correction element ZV4 is now formed by providing an electrically conductive coating on the power supply unit, in particular a rechargeable battery unit AK. A power supply unit of this type is preferably embodied as being rechargeable. The power supply serves to supply the electrical components and conductor paths on the printed circuit board LP with electric current. A metallic coating on the surface of the rechargeable battery can, for example, be provided along a strip of extended rectangular shape as the electrically conductive coating ME. The metallizing layer is connected to the printed circuit board LP via electrical contacting means KV4. The electrical contacting means KV4 of the rectangular metallizing path are preferably provided in the area of the front end of the printed circuit board LP in order to achieve as long as possible a flow path for the current. The maximum flow path provided for a current possibly flowing in the X direction extends here from the front end area of the printed circuit board LP in which the transmitting/receiving antenna AT3 is coupled to the opposite front end to which the correction element ZV4 is electrically coupled; added to this is the strip length of the correction element in the longitudinal direction X. The antenna AT3 is configured in the exemplary embodiment as a planar or, as the case may be, flat antenna. A slotted metal sheet or other electromagnetically conductive element is preferably used for this purpose. The antenna AT3 can here be formed in such a way as to function as both a dual-band and a multi-band antenna for transmitting and receiving electromagnetic radio waves within different frequency ranges. The antenna AT3 is supplied with current in the top area of the printed circuit board LP via an electric lead SS. At a different location from this, another area of the flat antenna AT3 is connected to the ground of the printed circuit board LP via electrical contacting means MK.

An electrically conductive path is therefore additionally provided here on the length WV* along the metallic coating ME in the X direction of the rechargeable battery unit AK, which is to say along the length of the printed circuit board LP. Viewed in total, the metallic coating ME on the rechargeable battery unit AK therefore effects a virtual electric elongation of the printed circuit board LP of length L by the path length WV*, with the original dimensions of the printed circuit board LP remaining. The dimensions also remain constant in terms of length and width since the additional elongation WV* is achieved by providing the additional current-path elongating conductor path ME in a plane above the area of the printed circuit board itself. The metallization area ME can be electrically linked or, as the case may be, contacted with the ground of the printed circuit board LP by means of, for example, electric wires, foils, or other electrically conductive intermediate elements.

In the exemplary embodiment shown in FIG. 7, the metallic coating ME on the exterior surface of the approximately cuboidal rechargeable battery unit AK is applied only to a partial area of the exterior surface of the rechargeable battery unit AK. It can equally be of practical advantage to apply the metallic coating ME over the entire top side of the rechargeable battery unit AK. One or more or all surfaces of the rechargeable battery can accordingly be partially or completely coated with a conductive coating of this type.

Figure 8:
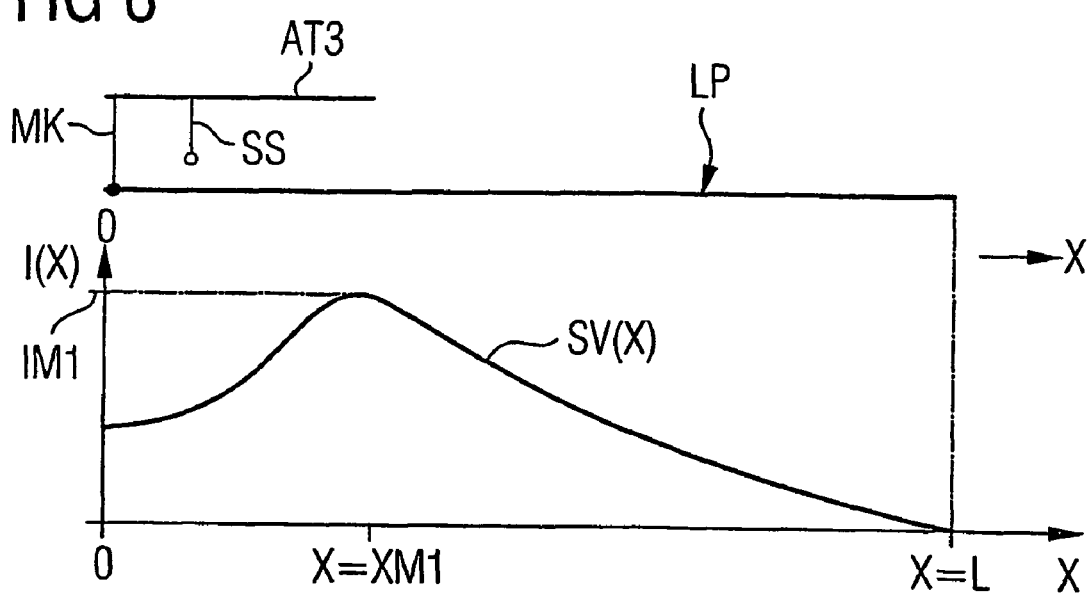
FIGS. 8 and 9 respectively show the course of the current flow along the length of the printed circuit board shown in FIG. 1 not having and having a further, modified, current-path elongating supplementary element.
Figure 9:
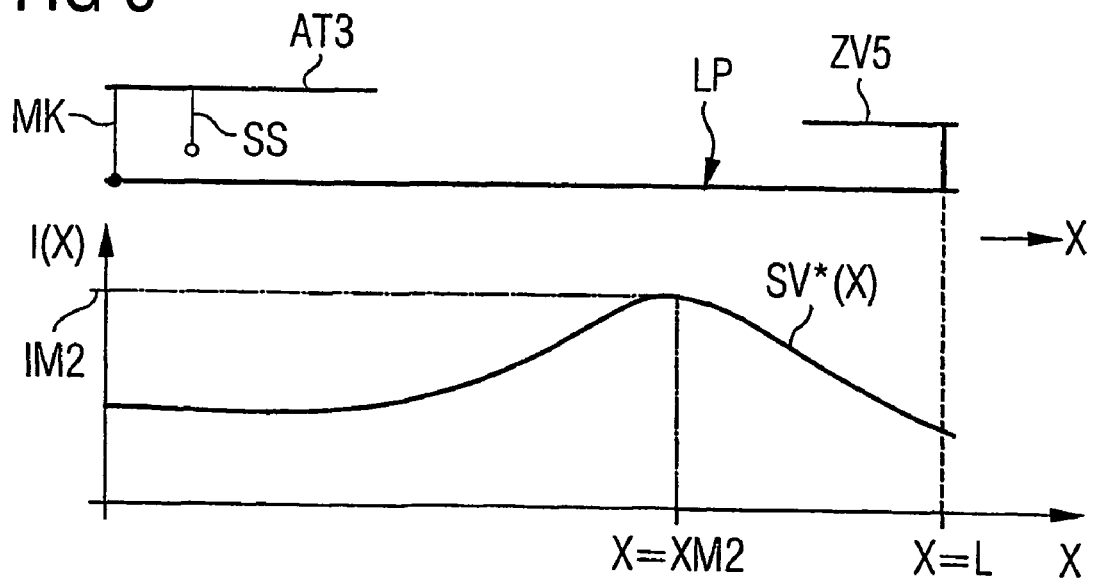

FIGS. 8 and 9 show exemplary displacements of what is termed the SAR "hotspot", which is to say the local maximum in the local distribution of summation current along the length of the printed circuit board not having and having a current-path elongating correction element. FIG. 8 shows in its top half a side view of the printed circuit board LP shown in FIG. 7 having the flat antenna AT3. The bottom half illustrates the local distribution of summation current I(X) occurring along the length of the printed circuit board in the X direction when a mobile radio telephone is being operated. The X direction is assigned to the abscissa. The flat antenna AT3 is electrically coupled to the printed circuit board LP at the left-hand front end of said board via a power supply lead SS and the ground contact MK. As the antenna AT3 is actively supplied with current in the area of said front end of the printed circuit board LP, the flow of current is greater than 0 ampere at the left-hand lateral edge of the printed circuit board LP. The summation current level reaches a local maximum IM1 at the point X=XM1 toward the center of the length of the printed circuit board LP of total length X=L. The total current density in the direction toward the end of the printed circuit board LP opposite antenna AT3 then drops until the flow of current is interrupted at the point x=L at the right-hand lateral edge so that I(X)=approximately 0 A. The overall result along the length of the printed circuit board is therefore a distribution of summation current SV(X) having a local maximum at X=XM1 in the half of the printed circuit board assigned to the antenna.

If an additional electrically conductive correction element ZV5 is now electrically linked or coupled to the front end of the printed circuit board LP opposite the facing, second front end area of the printed circuit board LP having the antenna coupling, depending on the dimensions, shape, positioning, and other material parameters (such as, for example, conductivity) of the correction element ZV5 it will be possible to displace at least the original local maximum along the length of the printed circuit board LP in the X direction. This is shown by the local current distribution SV*(X) in the bottom half of FIG. 9. The X direction is protracted along the abscissa, while the total current density I(X) has been assigned for each locus X of the ordinates. In FIG. 9 the current-elongating correction element ZV5 is formed by, for example, a wire element which, viewed from the side, is approximately right-angled. Generally, the longer the length of the wire element is selected in the X direction above the printed circuit board area, the greater the impact of the current-path elongation on account of this additional conductor path will be. As a result, the local current maximum IM2 is displaced in the X direction to the longitudinal point X=XM2>XM1. This makes it possible to alter the originally present, local distribution of the total flow of electric current on the printed circuit board operative for the SAR effect by means of the correction element according to the invention in such a way that the current level maximum or current level maxima can at least be displaced into a less critical area of the device, or even that the current level distribution is evened out. Alongside an evening-out of the current curve it is also possible to achieve a reduction in the current maximum or, as the case may be, maxima so that IM2<IM1 generally applies. As a result of this, the actual electromagnetic field distribution in the near area of the mobile radio device can be set in a more controlled manner. In the present exemplary embodiment shown in FIG. 9, the current level maximum IM2 is displaced along the X direction, which is to say along the length of the printed circuit board LP, away from the antenna area into a front end area opposite the other front end area of the printed circuit board LP having the antenna coupling. The reason for this targeted displacement measure is that the radio communication device is generally assigned in the area of the antenna coupling to the respective user's ear area, while the other front end of the radio communication device is situated in the respective user's cheek area and is separated from this by a larger gap or, as the case may be, transverse clearance.

This effect of displacing what is termed the SAR "hotspot" with the aid of the at least one correction element is illustrated in FIG. 10. A frontal schematic of the head HE of a user employing a mobile radio device MP it is illustrated with the mobile radio device MP being positioned against the cheek. The top end of the mobile radio device MP is assigned to the user's ear EA as that is where the loudspeaker of the mobile radio device MP is generally housed. Also located inside the housing GH of the mobile radio device MP is the high-frequency module of the printed circuit board LP having the transmitting/receiving antenna such as, for example, AT3 shown in FIG. 9. In the bottom front end area of its length facing away from the antenna area the printed circuit board LP additionally has the current-path elongating correction element ZV5 according to FIG. 9. The local summation current distribution curves according to FIGS. 8 and 9 not having and having a correction element are additionally indicated by means of a dot-and-dash line inside the housing GH. While in the case of a printed circuit board LP not having a correction element the local current level maximum is situated approximately in the contact area AZ of the housing GH against the respective user's head HE, when the correction element ZV5 is present the local current maximum can be displaced in accordance with the local current distribution curve SV*(X) toward the correction element ZV5 and hence taken away from the contact area and moved further toward the bottom end of the mobile radio device. Since, owing to the curvature or, as the case may be, arching of the respective user's head shape, there is generally a gap between the printed circuit board in the housing GH at the bottom end and the user's cheek BA, the maximum of the current distribution is therefore at least displaced into an area of the housing GH which is less critical in terms of producing the SAR rating. Due to the transverse clearance DB between the underside of the printed circuit board LP and the user's cheek BA, a maximum of the current level distribution present there can become far less effective. While the printed circuit board not having a correction element has the current level distribution SV(X) with a current maximum at a location on the printed circuit board having the transverse clearance DA to the user's cheek, the transverse clearance in the case of the printed circuit board LP having the correction element ZV5 is now displaced in accordance with the local current distribution SV*(X) to a longitudinal point where the transverse clearance between the printed circuit board and the respective user's cheek is enlarged to the gap clearance DB>DA.

Displacement of the originally present local maximum on the printed circuit board into an area having a larger gap clearance DB to the respective user's cheek than in the case of a printed circuit board not having a correction element has the following effect on the operative fields: In the area of the contact area AZ on the printed circuit board, a current possibly flowing on the printed circuit board causes an electromagnetic power density PA through the correspondingly produced magnetic H field of $PA=\frac{1}{2} ZFD\, H^2$, where ZFD is the characteristic wave impedance and H is the value of the magnetic field intensity. The power density of the magnetic field H reduces in inverse proportion to the square of the clearance or, as the case may be, distance to the source producing it through the flow of current. $PA \sim 1/DA^2$ thus applies in the area of the contact zone AZ. $PB \sim 1/DB^2$ and applies analogously in the area of the bottom half of the housing GH at the point of the displaced local current maximum to the power density of the H field produced by the current maximum. Forming the ratio between the two power densities will produce the following correlation: $PB/PA=DA^2/DB^2$. If the current maximum is then displaced into an area of the printed circuit board having approximately twice the transverse clearance or, as the case may be, gap clearance to the respective user's cheek so that DB=2 DA, the power density PB will drop to a quarter of the original power density at the original contact zone AZ.

Viewed along a normal axis to the printed circuit board area, the power density in the area of the displaced current maximum of the current path curve SV*(x) will have a power density at the user's cheek which is only a quarter that in the contact zone AZ of the housing GH where the printed circuit board has the distance of the transverse clearance DA from the user's cheek. This corresponds to a lowering of the effective energetic power density of approximately 6 dB, because $PB/PA=\frac{1}{4} => 10 \log PB/PA=6$ dB applies. If, therefore, the original local SAR-effective current maximum is displaced with the aid of the correction element into an area of the printed circuit board having approximately twice the transverse clearance to the respective user's head as originally, the originally effective power density will not only halve but will reduce to a quarter.

Under alternate embodiments, the shape of the housing GH of the radio communication device MP can be configured such that, in the area of the displaced current level maximum, it additionally has an outwardly convexly curved inner area pointing away from the user's head HE. The transversely axial clearance to the head, viewed along a normal axis of the printed circuit board area, can thereby be further increased so as to effect a further additional distance to the user's head where the displaced current maximum on the printed circuit board occurs.

The actual length of the respective correction element in its non-folded, most extended state is preferably selected to be between 10% and 90%, in particular between 10% and 50%, of the maximum possible embodiment of the ground length of the printed circuit board. The correction element therefore preferably has a length such as will produce an elongation path that is 1.1 to 1.5 times the original length of the printed circuit board for an electric current possibly flowing along the length of the printed circuit board. For an approximately 9 cm long and 4 cm wide rectangular printed circuit board, the length of the correction element in its flat, non-folded state may be selected between 1 and 8 cm, preferably between 1 and 5 cm.

The correction element can in particular also be embodied as being multiply kinked, angled or twisted like a screw (coiled). It can, as applicable, be composed of partial lengths at different heights.

It can advantageously be coupled to the printed circuit board not only galvanically but also, in addition to or independently of this, capacitively, inductively and/or on a radiation basis with the same function and mode of operation in terms of the current-path elongating effect.

As described above, at least one additional, electrically conductive correction element is therefore coupled to the respective printed circuit board and embodied in such a manner as to effect a targeted virtual current-path elongation for an electric current flowing on the printed circuit board induced by electromagnetic radio fields of an antenna, while at the same time substantially maintaining the printed circuit board's specified length and width. It is thereby possible to set electromagnetic radiation fields, in particular the H field in the near area, of the respective radio communication device, and/or electric currents due thereto, in a more controlled manner in terms of their local distribution. For example, a local maximum of the electric current operative on the printed circuit board for the SAR effect can, in a defined manner, be displaced, reduced, and/or distributed among several lower extremes.

A relatively high SAR rating for a mobile radio device is due in particular to inhomogeneities in the current distribution resulting on the printed circuit board. As a result of at least one electrically conductive correction element being additionally coupled to the printed circuit board in a space bounded by said board's lateral edges, at least one displacement of the at least one local current level maximum into less critical areas of the housing, and/or a substantially homogeneous field distribution along the length of the radio communication device is achieved while at the same time maintaining the printed circuit board's structural size or dimensions in terms of length and width. This advantageously allows the measurable SAR rating to be further reduced.

An additional correction element is preferably coupled to the printed circuit board and embodied in such a manner as to effect a fictive (virtual) current-path elongation for the electric current of a kind resulting in a desired reduction in the SAR (Specific Absorption Rate) rating in the printed circuit board's ambient domain.

The respective additional, electrically conductive correction element is in particular coupled to the printed circuit board such that said element's imagined orthogonal projection with reference to said board's equipping area lies substantially within a peripheral area bounded by said board's lateral edges.

The electrically conductive correction element is for this purpose preferably located in a space within and/or above and/or below and/or laterally in the peripheral area bounded by the lateral edges of the printed circuit board. Due to the correction element's formation with the printed circuit board, a type of multi-layered structure is produced without continuing and elongating or, as the case may be, broadening said board's dimensions in either the longitudinal or the transverse direction, and thus retaining the original dimensioning in terms of length and width.

Only in terms of depth as viewed, for example, in the Z direction according to the exemplary embodiment shown in FIG. 1, does the additional correction element appear as a further layer on the printed circuit board inside the housing of the mobile radio device.

The coupling according to the invention of at least one virtually current-path elongating correction element to the printed circuit board of a radio communication device is advantageous particularly when radio communication devices such as, for example, mobile radio devices or cordless telephones are used in keeping with their intended purpose. Due to controlling of the current-path elongation with the aid of the correction element, the magnetic field intensity in the near area of the antenna of the respective radio communication device and hence in the respective user's near area can be generated more homogeneously when the radio communication device is being used in keeping with its intended purpose and the SAR values reduced in the process. This, in turn, improves power emission.

The trend in the field of mobile radio technology is particularly toward mobile communication terminals of increasingly small volume and size. This is in particular reducing the length of the devices apart from their width and depth. As the frequency range within which the radio device has to operate is pre-specified and thus remains unalterable, there is a reduction in the ratio of device length and wavelength. This influence results in reduced power emission for the respective device as the effective length of the antenna is reduced. This could be compensated by increasing the power fed to the antenna; the effect of this, in turn, would be, however, that higher currents could flow on the printed circuit board. This at the same time would in turn lead to an increase in the SAR rating, which is undesirable. In contrast to this, the virtual current-path elongation according to an embodiment of the invention by means of at least one correction element coupled to the printed circuit board reduces what are termed the "hotspots" and/or displaces these into less critical zones on the device. The power emission can be improved and the SAR values diminished thereby. The correction element according to the invention can in certain circumstances even be advantageously employed as a design element. It can, for instance, be co-integrated into the respective radio communication device's display facility or keypad.

Other approaches to a solution that may be possible alongside the correction element according to the invention in addition to or independently of this include:

a) Increasing the distance between the areas of large current amplitude in the mobile radio device and in the user's head:

In devices having an external antenna, the current maxima are located directly on the antenna. This approach consequently results in external antennas that are located on the back of the device and are frequently bent away from the respective user's head. In devices having an integrated antenna, the antenna is accommodated inside the housing of the respective mobile radio device on the side of the printed circuit board facing away from the user's head. Alternately, the printed circuit board may be configured to be as deep as possible in the device to maximize the distance between the printed circuit board and user's head. The distance between the printed circuit board and user's head is in particular maximized at the place where the mobile radio device makes direct contact with the respective user's cheek. Also, the printed circuit board may be mounted relatively close to the rear device enclosure and provide it with as large as possible a gap clearance to the top device enclosure. Too great a device thickness is, however, in practice undesirable as it detracts from easy manageability. Moreover, on account of the specified dimensions of the radio devices the SAR values can only be reduced to a limited extent using this approach alone.

b) Shielding the electromagnetic emissions in the direction of the user's head:

The beam characteristics of the radio communication devices in the horizontal plane are altered using this approach. The beam effect intensifies emission power in the direction of the rear of the device and reduces emission power in the direction of the user's head. The effect is discernible in integrated antennas having a full-coverage ground area on the printed circuit board which acts as a reflector. Too large an increase in the beam effect is, however, undesirable in mobile radio antennas and is also subject to physical limitations as transmitting and receiving operations would otherwise be excessively disrupted.

c) Absorbing the electromagnetic emissions using lossy material in the areas responsible for high SAR values:

The use of this approach alone has the disadvantage, however, that emissions produced by complex means may be destroyed again by simple means. This diminishes the performance of the mobile radio devices and will lead, in particular to shorter standby and talk times, which is undesirable. Approaches of this type are known from, for example, EP 0 603 081 A1.

d) Reducing the high-frequency currents or, as the case may be, re-distributing them. This approach advantageously allows a number of variants:

i.) The power emission and hence, simultaneously, the power radiated into the user's head is reduced by simple means without altering the radio device. The use of this approach alone is, however, precluded by the specified minimal requisite output power. A further reduction in the SAR rating thus does not appear possible.

ii.) The printed circuit board is widened. Increasing the width of the printed circuit board will bring about a reduction in the current density, and hence a reduction in the SAR rating, with the current intensity in the longitudinal direction of the printed circuit board being retained. The use of this approach alone is, however, ruled out for further reducing the SAR rating on account of the specified dimensions of the housings for mobile radio devices.

In addition, although the invention is described in connection with mobile telephones, it should be readily apparent that the invention may be practiced with any type of communicating device, such as a personal assistant or even a PC-enabled device. It is also understood that the device portions and segments described in the embodiments above can substituted with equivalent devices to perform the disclosed methods and processes. Accordingly, the invention is not limited by the foregoing description or drawings, but is only limited by the scope of the appended claims.

The invention claimed is:

1. A radio communication device comprising:
   at least one printed circuit board accommodated in a housing;
   at least one antenna, coupled to said printed circuit board, wherein said at least one antenna emits and/or receives electromagnetic radio fields; and
   at least one electrically conductive correction element coupled to the printed circuit board, wherein said correction element produces a current-path elongation for an electric current induced on the printed circuit board by electromagnetic radio fields of the antenna, and wherein the at least one correction element is mounted in the area of a front end of the printed circuit board which is opposite another front end of the printed circuit board sharing the coupling area of the antenna;
   and wherein the at least one correction element is positioned so that its orthogonal projection into an equipping area of the printed circuit board lies substantially within a peripheral area bounded by the lateral edges of the printed circuit board.

2. The radio communication device according to claim 1, wherein the current-path elongation for the electric current produces a reduction in the SAR (Specific Absorption Rate) rating in the ambient domain of the printed circuit board.

3. The radio communication device according to claim 1, wherein the at least one correction element is located in a space within and/or above and/or below and/or laterally in the peripheral area bounded by the lateral edges of the printed circuit board.

4. The radio communication device according to claim 1, wherein one or more electrically conductive wires is provided as a conductive correction element.

5. The radio communication device according to claim 1, wherein at least one single or multi-layer electrically conductive foil, coating, and/or other electrically conductive material is provided as a conductive correction element.

6. The radio communication device according to claim 1, wherein the at least one correction element is coupled such that the current-path elongation for an electric current has a main direction of flow along the length of the printed circuit board.

7. The radio communication device according to claim 1, wherein the printed circuit board is substantially rectangular.

8. The radio communication device according to claim 7, wherein the at least one correction element and the antenna are attached relative to each other to the printed circuit board in such a manner as to be assigned substantially to two diagonally opposite, electrically effective corner areas of the printed circuit board.

9. The radio communication device according to claim 1, wherein the at least one correction element and the antenna are attached to the printed circuit board in such a manner that they together form an electric roof capacitance.

10. The radio communication device according to claim 1, wherein the at least one correction element is formed by means of an elongating element of U-profile type located in roof manner on the front end of the printed circuit board facing away from the antenna.

11. The radio communication device according to claim 1, wherein the at least one correction element is formed by means of an electrically conductive elongating element which, proceeding from the printed circuit board, is singly or multiply folded and/or bent round in one or more layer planes into a space within and/or above and/or below the peripheral area.

12. The radio communication device according to claim 1, wherein the at least one correction element is meander-shaped.

13. The radio communication device according to claim 1, wherein the correction element is formed by means of the separate antenna ground of a PIFA (Planar Inverted F) antenna.

14. The radio communication device according to claim 1, further comprising a battery unit, wherein the at least one correction element is formed by means of at least one electrically conductive coating on the rechargeable battery unit.

15. The radio communication device according to claim 1, wherein the at least one correction element is attached as an integral part of the board ground of the printed circuit board, and wherein the at least one correction element has a meander form.

16. The radio communication device according to claim 15, wherein a partial area of a ground area of the printed circuit board is separated from said board in the same topology plane in such a manner as to provide an elongation of the current path.

17. The radio communication device according to claim 1, wherein the at least one correction element has a predetermined length to produce a path elongation that is 1.1 to 1.5 times the original length of the printed circuit board for an electric current flowing along the length of the printed circuit board.

18. The radio communication device according to claim 1, wherein the at least one antenna a $\lambda/4$ antenna or PIFA (Planar Inverted F) antenna which, together with the printed circuit board, forms a radiant dipole.

19. The radio communication device according to claim 1, wherein the at least one antenna is a substantially planar internal antenna.

20. The radio communication device according to claim 1, wherein the at least one antenna is a rod antenna projecting outwardly from the housing.

21. The radio communication device according to claim 1, wherein the at least one correction element is coupled to the printed circuit board galvanically, capacitively, inductively and/or on a radiation basis.

22. The radio communication device according to claim 1, wherein at least one of the correction elements is embodied as a metallic coating on the housing enclosures and/or other parts of the radio communication device and wherein the correction elements are linked to the radio communication device's ground system.

23. A radio communication device comprising:
at least one printed circuit board accommodated in a housing;
at least one antenna, coupled to said printed circuit board, wherein said at least one antenna emits and/or receives electromagnetic radio fields; and
at least one electrically conductive correction element coupled to the printed circuit board, wherein said correction element produces a current-path elongation for an electric current induced on the printed circuit board by electromagnetic radio fields of the antenna, wherein the at least one correction element is mounted in the area of a front end of the printed circuit board which is opposite another front end of the printed circuit board sharing the coupling area of the antenna.

24. A radio communication device comprising:
at least one printed circuit board accommodated in a housing;
at least one antenna, coupled to said printed circuit board, wherein said at least one antenna emits and/or receives electromagnetic radio fields; and
at least one electrically conductive correction element coupled to the printed circuit board, wherein said correction element produces a current-path elongation for an electric current induced on the printed circuit board by electromagnetic radio fields of the antenna, and wherein the at least one correction element is mounted in the area of a front end of the printed circuit board which is opposite another front end of the printed circuit board sharing the coupling area of the antenna, and
wherein the at least one correction element is formed by means of an elongating element of U-profile type located in roof manner on the front end of the printed circuit board facing away from the antenna.

25. A radio communication device comprising:
at least one printed circuit board accommodated in a housing;
at least one antenna, coupled to said printed circuit board, wherein said at least one antenna emits and/or receives electromagnetic radio fields; and
at least one electrically conductive correction element coupled to the printed circuit board, wherein said correction element produces a current-path elongation for an electric current induced on the printed circuit board by electromagnetic radio fields of the antenna, and wherein the at least one correction element is mounted in the area of a front end of the printed circuit board which is opposite another front end of the printed circuit board sharing the coupling area of the antenna, and
wherein the at least one correction element is formed by means of an electrically conductive elongating element which, proceeding from the printed circuit board, is singly or multiply folded and/or bent round in one or more layer planes into a space within and/or above and/or below a peripheral area of the printed circuit board.

26. A radio communication device comprising:
at least one printed circuit board accommodated in a housing;
at least one antenna, coupled to said printed circuit board, wherein said at least one antenna emits and/or receives electromagnetic radio fields;
at least one electrically conductive correction element coupled to the printed circuit board, wherein said correction element produces a current-path elongation for an electric current induced on the printed circuit board by electromagnetic radio fields of the antenna; and a battery unit, wherein the at least one correction element is formed by means of at least one electrically conductive coating on the battery unit.

27. A radio communication device comprising:

at least one printed circuit board accommodated in a housing;

at least one antenna, coupled to said printed circuit board, wherein said at least one antenna emits and/or receives electromagnetic radio fields; and at least one electrically conductive correction element coupled to the printed circuit board, wherein said correction element produces a current-path elongation for an electric current induced on the printed circuit board by electromagnetic radio fields of the antenna, wherein the at least one correction element has a predetermined length to produce a path elongation that is 1.1 to 1.5 times the original length of the printed circuit board for an electric current flowing along the length of the printed circuit board.

* * * * *